3,068,951
SWINGING AXLE SUSPENSION SYSTEM
FOR VEHICLE DRIVE AXLES
Henry Lowe Brownback, Reach Road, Deer Isle, Maine
Filed June 23, 1960, Ser. No. 38,232
2 Claims. (Cl. 180—73)

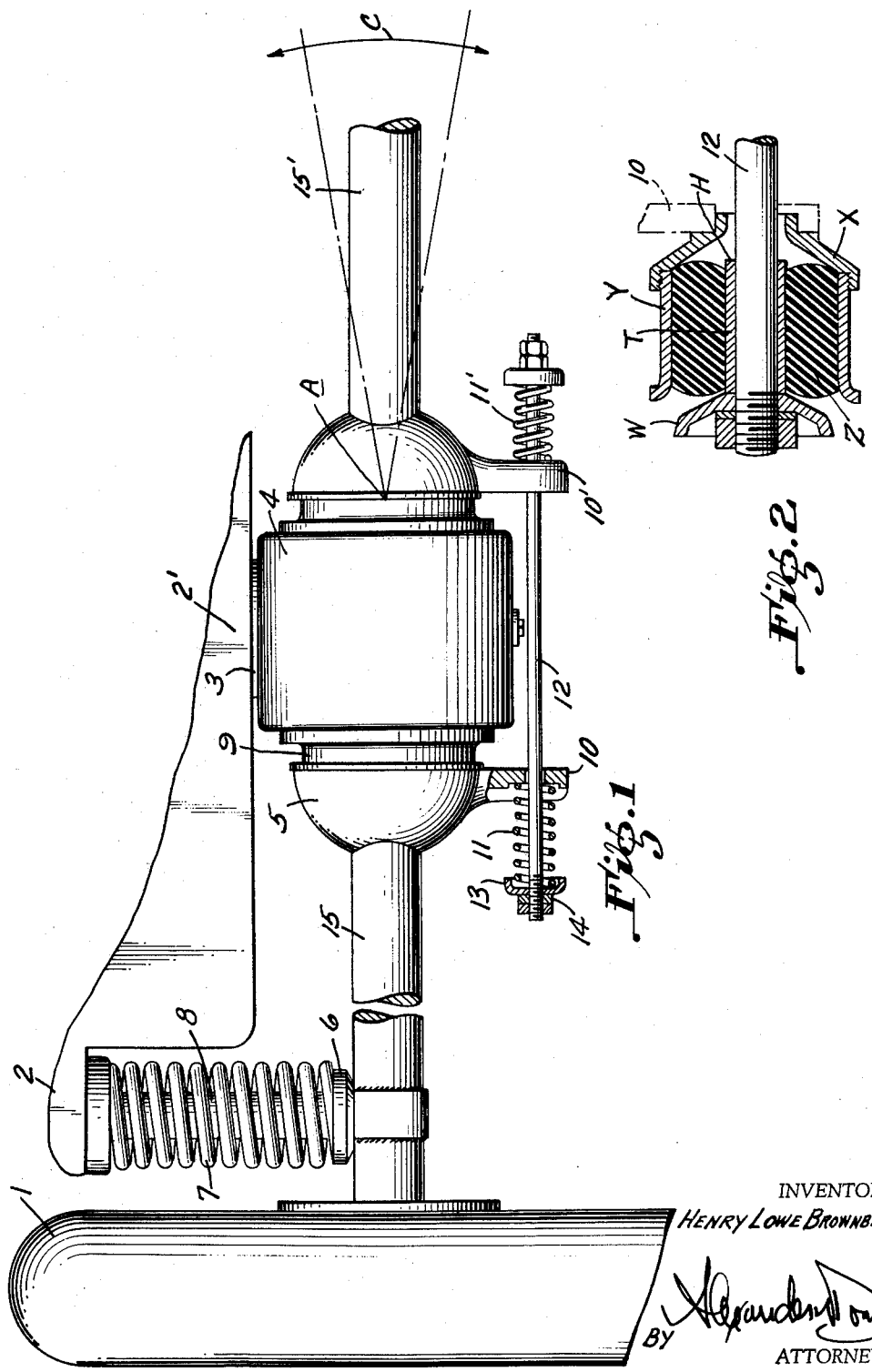

This invention relates to the suspension system of motor cars, and particularly to those having "independently" suspended rear wheels, and more particularly where a divided or "swing" type of rear axle is used, in which the differential housing is fastened to the car's chassis or body, and the axle or axle tubes carrying the wheels are swung from this housing in such a manner that they may oscillate in a vertical direction allowing the wheels to rise or drop from the loaded axis of the system.

My invention also applies to the single split-axle system in which two axles or tubes are each carried by a corresponding point of oscillation fixed relative to the chassis or body of the car, and each axle or tube can oscillate about its corresponding point of oscillation.

This invention has a multiple purpose or function. One function is to soften the ride by allowing softer main suspension springs to be used, and thus the car in the unloaded condition, or lightly loaded, will have a very low rear spring rate, making for an easy ride. As the load is increased, or if the car strikes a bump or roll in the road, the deflection of the rear springs will bring the normally floating, or almost so, equalizer system into action; and the springs of this equalizer, whether they be of the coiled type or the preferred rubber type will, become loaded, and react, thus raising the spring rate progressively as the loading increases, either from weight or reaction to a bump increase.

On the other hand, if the car enters a turn at high speeds, and the body tends to "roll" somewhat in the turn, the loading of the equalizer springs will not be increased, which demands from the front springs a much larger share of the roll resistance than they would have in a suspension in which the main springs would have the same resistance to roll as have the rear main springs, plus the equalizer springs in the invention shown, and this in turn decreases the tendency to oversteer. If one wheel rises due to a bump, or from forces engendered in making a sharp turn, the equalizer system becomes loaded equally on both sides and keeps both wheels on the ground.

I will explain the invention with reference to the accompanying drawing, which illustrates several practical embodiments thereof to enable others familiar with the art to adopt and use the same; and will summarize in the claims the novel features of construction, and novel combinations of parts for which protection is desired.

In said drawings:

FIG. 1 is a rear view of a vehicle showing one embodiment of my invention, applied thereto;

FIG. 2 is a detail illustrating a modification.

In the drawing, I show a typical swing axle system, in which 1 is one rear wheel, 2—2' is the chassis or body of the vehicle, 3 is the point of attachment of the differential system of the rear axle to the chassis 2—2', or body of the vehicle, 4 is the differential housing of the rear axle syster, 5 is one of the oscillating points of the swing axle, oscillating about point A, 6 is the chair for one of the main suspension springs, 7 is one of the main suspension springs, 8 is a spring damper or "shock absorber" which may be carried inside of the spring 7 or at some other convenient point, and which is attached to the frame 2 or body of the vehicle and the oscillating or swing axle of the axle tube 15, 9 is the point of attachment of the oscillating point or housing which forms part of the oscillating axle or tube and bears on 9 which forms part of the differential housing. This 5—9 combination shown is simply the cover, and the actual oscillation system is by a pin-and-trunnion, or similar combination, which allows the axle or tube to oscillate about the point of oscillation A upwards and downwards along the arc of a circle C.

11 is one of the two equalizer springs. Although two are shown, one could be used and give the same effect. In this case equalizer bar 12 would float through the equalizer arm 10 and be fastened flexibly to equalizer arm 10'. As shown with two springs, equalizer bar 12 floats through both equalizer arms 10 and 10'. The equalizer arms 10—10' are fastened to the oscillating axles in the plane of oscillation, and preferably in such a manner that the center of equalizer bar 12 is tangent to a circle drawn about point of oscillation A. 12 is the equalizer bar and is not attached to the differential housing, and only to the arms 10—10' of the swing axles by the springs 11—11' and their attachments where two equalizer springs are used or attached to one arm, 10 or 10' and floating to the other being located by the equalizer spring system.

13 is the cup for equalizer spring 11, and 14 the nuts or other attachments to locate cup 13 on equalizer bar 12, thus fastening the spring 11 in place. 15 and 15' are the swing axles or tubes and usually have the axle drive shafts passing through them, having a bearing at the wheel end and carrying the brake mechanism at the outer end. They oscillate on the differential housing 4 in a plane from the center of the point of oscillation; and the center of the road wheel, and the axle shaft which is carried in the wheel hub at the outer end is carried in a universal or flexible joint at or near the point of oscillation A so as to drive the wheels and allow the swing axle or tube to oscillate.

It is to be noted that while the coiled type of suspension spring is shown as the main road spring, torsion bars, leaf or rubber springs may be used without in any way affecting the basis of the invention.

When the car is unloaded, all of the weight will be carried by the main suspension springs 7, or nearly all of it, and the equalizer springs 11—11' will be unloaded or approximately unloaded, but if a weight is added or the wheels rise for bumps these suspension springs 7 deflect and this tends to raise the wheel centers in relation to the body or chassis and this, in turn, causes the axle or axle tubes 15—15' to which the road wheels are fastened or in which they bear, to rise rotating about the point of oscillation A, or about the single fulcrum of the two-piece swing axle.

This will compress the equalizer spring or springs 11—11', and because of the floating equalizer bar 12 the reaction on the equalizer arms 10—10' will be the same. This will provide a progressively greater spring rate or spring carrying capacity as the deflection of the main springs increases. On the rebound the equalizes will act only to the unload point, or slightly beyond it, so that they tend to limit the rebound load on the spring dampers. If one wheel rises, the axle oscillates opening the space between the equalizer arms in the same manner as when both wheels rise and the equalizer springs reacting keep both wheels on the road. If the body rolls in a turn, neither of the equalizer springs is depressed or loaded as the equalizer bar floats, and therefore the equalizer does not react and the roll is corrected by the front suspension. This will reduce oversteer.

While in the foregoing description I have shown the equalizer springs as simple coil or helical springs, I prefer to use a rubber spring because of the superior hysteresis properties of rubber, and also because by shaping the elements of the spring, I can provide for a progressively great spring rate as load is applied.

In FIG. 2 I show such a spring in which the equalizer bar is shown as 12 and the equalizer arms as 10—10'.

The spring comprises an inner element T, preferably of metal which bears on equalizer bar 12, and an outer element Y also of metal. Between these two elements there is a rubber element Z which is either pressed into place or bonded to T and Y. Outer metallic element Y bears against or is fastened by some suitable method in an end piece X which in turn bears in equalizer arm 10 and is located therein in such a manner that equalizer bar 12 does not touch either X or 10 and can move along its axis.

At the outer end of the spring there is a thrust disc W which is smaller than the inside diameter of Y and which is held against T by a nut or some suitable fastening. At point H, T may bear against a circlip or a shoulder in 12 or may just be held in place by thrust. When there is no load present rubber element Z does not touch either W or X. In this condition, the primary movement of 12 will be resisted by the rubber in Z in shear, but as the movement increases W will be pulled against the rubber element Z forcing it against X in combined shear and compression, and as the movement continues the rubber will be crowded between W and X in compression.

By shaping the surfaces of W and X one may so cause the change from shear through the combination of shear and compression and into compression to occur in such a manner as to give any desired curve of resistance, and thus any desired differential in movement against resistance that one may desire.

I claim:

1. In a suspension system for motor vehicles, having a body and having independently suspended rear wheels utilizing a divided type of rear axle, and having a differential housing secured to said body, with the rear axles extending from said housing to allow the wheels to rise and drop respectively; rear coil springs interposed between the divided rear axles and the undersides of the body; and a normally floating equalizer system connecting the divided rear axle sections and adapted to be activated due to increased weight or reaction to a bump on an axle sections; said equalizer system including depending arms on said axle sections below the differential; an equalizer bar floatingly extending through the said arms; members mounted in the arms through which the bar freely extends; sleeves on the ends of said bar spaced from said members; collars around said sleeves engaging said members; rubber elements bonded to said sleeves and collars; and thrust discs on the outer ends of said bar adjustably engaging the outer ends of said sleeves; whereby primary movement of the bar will be resisted by said rubber elements, but as the movement increases the thrust discs will be pulled against the rubber elements forcing same against the members in combined shear and compression, crowding the rubber between the discs and members.

2. In a suspension system for motor vehicle, having a body and having independently suspended rear wheels utilizing a divided type of rear axle, and having a differential housing secured to said body, with the rear axles extending from said housing to allow the wheels to rise and drop respectively; rear coil springs interposed between the divided rear axles and the undersides of the body; and a normally floating equalizer system connecting the divided rear axle sections and adapted to be activated due to increased weight or reaction to a bump on an axle section; said equalizer system including an equalizer bar floatingly extending through the said axle sections; end pieces mounted on the axle sections through which the bar freely extends; sleeves on the ends of said bar spaced from said end pieces; collars around said sleeves engaging said end pieces; rubber elements bonded to said sleeves and collars; and thrust discs on the outer ends of said bar adjustably engaging the outer ends of said sleeves; whereby primary movement of the bar will be resisted by said rubber elements, but as the movement increases the thrust discs will be pulled against the rubber elements forcing same against the end pieces in combined shear and compression, crowding the rubber between the discs and end pieces.

References Cited in the file of this patent

UNITED STATES PATENTS

| 1,273,412 | Salsbury | July 23, 1918 |
| 2,005,103 | Moorhouse | June 18, 1935 |
| 2,010,415 | Roller | Aug. 6, 1935 |

FOREIGN PATENTS

| 1,161,498 | France | Mar. 24, 1958 |
| 1,187,127 | France | Mar. 2, 1959 |
| 714,281 | Great Britain | Aug. 25, 1954 |